March 2, 1965 E. G. JOHNSON 3,171,915

FLUID AMPLIFIER APPARATUS

Filed May 15, 1962

INVENTOR.
ELMER G. JOHNSON

BY Roger W. Jensen

ATTORNEY.

3,171,915

FLUID AMPLIFIER APPARATUS

Elmer G. Johnson, St. Paul, Minn., assignor to Honeywell Inc., a corporation of Delaware Filed May 15, 1962, Ser. No. 194,826
11 Claims. (Cl. 200—81.9)

This invention pertains to control means, and more particularly to fluid amplifier control means.

This invention comprises a control means having a plurality of conditions; control signals are operable to change the condition of the control means. The applicant's invention, in one embodiment, comprises a fluid amplifier having movable means which perform a control or switching function in response to fluid flow control signals. The applicant's invention converts fluid signals in the form of fluid flow or pressure changes into an electrical signal and thus may be considered in one sense a transducer. The applicant's unique fluid amplifier control means provides a number of advantages over prior art control devices. The applicant's unique fluid amplifier control means is much lower in cost than previously available control devices because molded or stamped parts comprise the entire assembly. In addition the applicant's fluid amplifier control means will operate at temperatures of several thousand degrees if necessary, needs no insulation mounts, and needs no regulated power supply.

These advantages of the applicant's unique fluid amplifier control means make it extremely useful in all applications in which the control parameters are fluid flow or pressure differentials. For example, it may be utilized as an engine failure warning system, inlet control-shock location sensor for jet engines, as a stall warning system for airplanes, and as an angle of attack sensor, among other applications.

It is therefore an object of this invention to provide an improved control apparatus.

Figure 1:
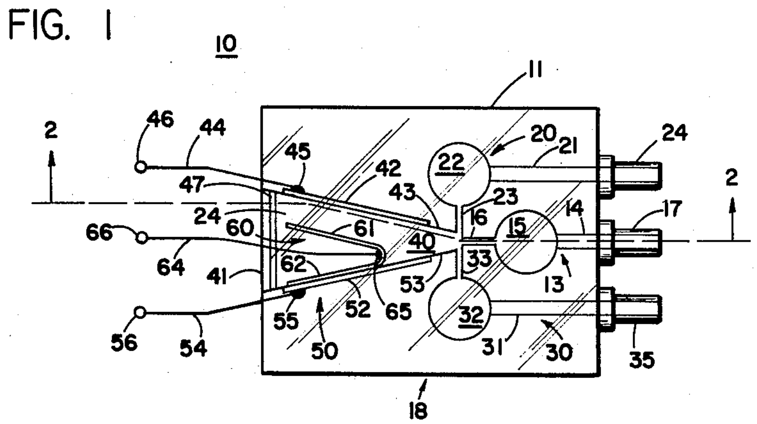
Figure 2:
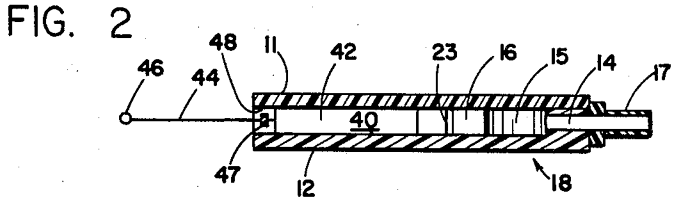
Figure 3:
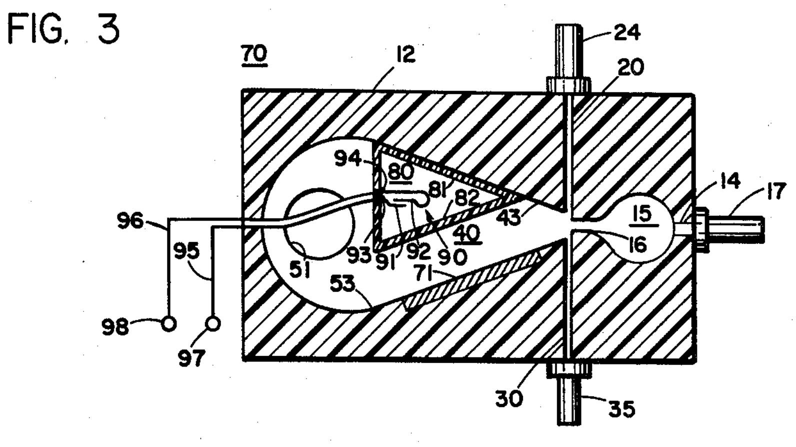

This and others objects of the invention will become apparent from a study of the accompanying specification and claims in conjunction with the drawing in which, FIGURE 1 is a schematic plan view of the applicant's unique control means;

FIGURE 2 is a schematic cross-sectional view taken along section line 2—2 of FIGURE 1; and FIGURE 3 is a schematic cross-sectional view of an alternate embodiment of the applicant's invention.

Referring now to FIGURE 1, reference numeral 10 generally depicts a fluid amplifier control means. A transparent, rectangular shaped cover plate is identified by reference numeral 11. It should be pointed out that the cover plate 11 need not be transparent, in fact nearly and type of material desired may be utilized for the cover plate 11. The cover plate illustrated in FIGURES 1 and 2 is an electrical insulator, however this is not a necessity as will be further discussed hereinafter.

A body element 12 is provided as shown in FIGURE 2. Body element 12 cooperates with cover element 11 to define a rectangular shaped fluid amplifier control means housing means which is identified by reference numeral 18. One end of rectangular shaped housing 18 is identified as a surface 41. It should be noted that all of the machining operations necessary for the fluid amplifier switch are performed upon the body element 12 and that the cover element 11 merely provides a cover for this body element 12. Cover element 11 is attached to body element 12 by suitable means (not shown) such as screws or adhesives.

A fluid supply passage 13 is provided within the housing means 18 so as to supply a suitable fluid. Fluid supply passage 13 comprises a fluid conduit 14, a fluid chamber 15 and an orifice 16. It should be pointed out that fluid passage 13 need not be constructed in this particular manner, but is so constructed so as to provide for ease of machining. A connector means 17 is attached to housing 18 to connect passage 13 to a fluid source (not shown).

Two fluid control passages 20 and 30 are provided within housing means 18. Fluid control passage 20 comprises a fluid conduit 21, a fluid chamber 22, and an orifice 23. A connector means 24 is attached to housing 18 to connect fluid control passage 20 to a control signal source (not shown). Fluid control passage 30 comprises a fluid conduit 31, a fluid chamber 32, and an orifice 33. A connector means 35 is attached to housing 18 to connect fluid control passage 30 to a control signal source (not shown).

A triangular or wedge shaped exit chamber 40 is provided in body 12 of housing 18 having a first wall 43 and a second wall 53. Wall 43 forms one leg of the wedge-shaped chamber 40 and wall 53 forms another leg of chamber 40. It will be noted that chamber 40 is in communication with orifices 16, 23 and 33. Housing 18 has an exhaust opening 48 therein along surface 41. The exhaust opening 48 is in communication with chamber 40. A stop member 47 is positioned across chamber 40 contiguous surface 41 of housing 18. Stop member 47 does not interfere with the exhaust of fluid from chamber 40 through exhaust opening 48. The function of stop member 47 will be more fully discussed hereinafter, however it should be noted that any suitable porous material, such as a screen, may be substituted for stop 47.

A control means 50 is provided having a first condition and a second condition. Fluid flow within control passages 20 and 30 is effective to change the condition of control means 50. The component parts of control means 50 will now be discussed in detail.

A first contact means 42 is positioned within exit chamber 40. Contact means 42 is recessed into wall 43 of chamber 40, and rigidly attached to body 12 of housing 18 by suitable means (not shown) such as adhesives. Thus contact means 42 and wall 43 are coplanar and form one leg of wedge shaped chamber 40. A lead 44 is connected at one end to contact means 42 by means of terminal 45. Lead 44 is connected at the other end to a terminal 46 which is adapted to be connected to an external load (not shown).

A second contact means 52 is positioned within exit chamber 40. Contact means 52 is recessed into wall 53 of exhibit chamber 40 and rigidly attached to body element 12 of housing 18 by suitable means (not shown) such as adhesives. Thus contact means 52 and wall 53 are coplanar and form another leg of wedge shaped chamber 40. A lead 54 is connected at one end to contact means 52 by means of a terminal 55. Lead 54 is connected at the other end to a terminal 56 which is in turn connected to an external load (not shown).

A movable means 60 having a triangular or wedge shaped cross section is positioned within exit chamber 40. Movable means 60 comprises two diverging legs 61 and 62. In the embodiment illustrated in FIGURE 1, legs 61 and 62 of movable means 60 are fabricated from an electrically conductive material. Thus legs 61 and 62 each form a contact means. A terminal 65 is provided, which is electrically connected to legs 61 and 62. If desired, legs 61 and 62 may be fabricated from an electrically non-conductive material with suitable contact means applied thereto and connected to terminal 65. Other embodiments will be obvious to those skilled in the art and the applicant does not wish to be limited to the embodiment discussed. Movable means 60 is constructed such that the angle between the diverging legs 61 and 62 is substantially equal to the angle between wall 43 and wall 53 of chamber 40. Thus if movable means 60 is positioned adjacent wall 43 and contact means 42, leg 61 thereof will engage contact means 42 substantially along the axial extent thereof. In a like manner, should the movable means 60 be moved adjacent to wall 53 and contact means 52, leg 62 thereof will engage contact means 52 substantially along the axial extent thereof. A lead 64 is connected at one end to movable means 60 at terminal 65. Lead 64 is connected at the other end to terminal 66, which in turn is connected to the external load (not shown).

In the embodiment illustrated in FIGURE 1, contact means 42, leg 61 of movable means 60, contact means 52, leg 62 of movable means 60, and terminals 45, 55 and 65, collectively define control means 50. Control means 50 has a first condition and a second condition. When leg 61 engages contact means 42, control means 50 is in a first condition. When leg 62 engages contact means 52, control means 50 is in a second condition. It should be noted that the applicant does not wish to be limited to the control means illustrated in FIGURE 1. Any control means having a plurality of conditions may be utilized, for example, the control means illustrated in FIGURE 3.

In operation, fluid supply passage 13 is connected to a suitable fluid source (not shown). Fluid flows from the source through connector 17, conduit 14, chamber 15, orifice 16 and into exit chamber 40 and exhausts therefrom through opening 48. The effect of the fluid flowing through passage 13 is to force movable means 60 into engagement with contact means 42 or contact means 52. The position of movable means 60 due to fluid flow through passage 13 is determined by the position of orifice 16 relative to chamber 40 or the geometry of orifice 16 or both. For example, if orifice 16 is positioned nearer to wall 43 than to wall 53 of chamber 40, the fluid flow through chamber 43 will be such that movable means 60 will engage contact means 52 as illustrated in FIGURE 1. If the wall of orifice 16 nearest to orifice 23 is tapered slightly towards wall 43, the fluid flow through chamber 40 will be such that movable means 60 will engage means 52 as illustrated in FIGURE 1. More specifically, by so positioning or so constructing orifice 16 the fluid exhausting therefrom attaches to and flows along wall 43 in accordance with the well known Coanda effect. This flow pattern results in an aerodynamic pressure across movable means 60 which forces it against contact 52. Movable means 60 may be made to engage contact means 42 upon fluid flow through passage 16 in an obvious manner. When movable means 60 engages contact means 52 an electrical circuit is established between terminals 56 and 66 and control means 50 is in a first condition. For purposes of illustration, assume removable means 60 is engaging contact means 52.

Fluid control passages 20 and 30 are connected to suitable control sources (not shown). That is, fluid control passages 20 and 30 are connected to suitable sensing ports such that a pressure differential therebetween would result in fluid flow in either control passage 20 or control passage 30. For example, should control passages 20 and 30 be connected to suitable sensing ports located in the air inlet portion of a high performance jet engine, a shock wave occurring within the inlet area would result in a pressure differential between passages 20 and 30. If the pressure in passage 20 is greater than the pressure in passage 30, fluid will flow through orifice 23 so as to impinge upon the fluid flowing from orifice 16 of passage 13. The flow of fluid through orifice 23 and the associated pressure forces produced in chamber 40 will force the fluid flowing through exit chamber 40 to flow along the wall 53 of chamber 40. As viewed in FIGURE 1, this would result in a greater aerodynamic pressure acting upon leg 62 of movable means 60 than upon leg 61 of movable means 60. Thus a net force would be exerted on movable means 60 forcing it into contact with contact means 42. Thus a circuit is completed between terminal 66, lead 64, terminal 65, leg 61 of movable means 60, contact means 42, terminal means 45, lead 44, and terminal means 46 resulting in a switching operation. It is clear that fluid flow in control passage 20 is effective to change the condition of control means 50.

Should the pressure in passage 20 be greater than the pressure in passage 30, and movable means 60 be engaging contact means 42 leg 62 of movable means 60 would be forced into engagement with contact means 52 in an obvious manner. Thus, fluid flow in contact passage 20 would also be effective to change the condition of control means 50.

The stop member 47 prevents movable means 60 from being forced out of chamber 40 due to a lapse in the fluid flowing therein. However the movable object 61 normally assumes an intermediate position as shown in FIGURE 1 during fluid flow through chamber 40. Any suitable means for accomplishing this function may be substituted for stop member 47.

Referring now to FIGURE 3, reference numeral 70 generally depicts an alternate embodiment of the applicant's invention. In describing FIGURE 3, like reference numerals will be utilized to identify components identical to those illustrated in FIGURES 1 and 2. A body portion 12 is provided which cooperates with a cover portion (not shown) to form a housing means (not shown). The housing means may be constructed of either electrically conductive or non-conductive materials. A fluid supply passage 13 is provided in body 12. Supply passage 13 comprises conduit 14, chamber 15 and orifice 16. A connector means 17 is attached to body portion 12 to connect supply passage 13 to a fluid source (not shown).

A first fluid control passage 20 is also provided within body 12. A connector means 24 is attached to body 12 to connect control passage 20 to a suitable control port. A second fluid control passage 30 is provided in body 12. Control passage 30 is provided with connector means 35 attached to body 12 to connect fluid passage 30 to a suitable control port.

An exit chamber 40 is provided within body 12 having a generally triangular or wedge shaped cross section. Control passages 20 and 30 and supply orifice 16 are all in communication with exit chamber 40. An exit opening 51 is provided so that fluid may exhaust from exit chamber 40. A permanent magnet 71 is positioned within exit chamber 40 and rigidly attached to body 12 by suitable means (not shown) such as adhesives. Permanent magnet 71 is recessed into the wall 53 of exit chamber 40 so it is coplanar with wall 53.

A movable means 80 having a wedge shaped cross section is positioned within exit chamber 40. Movable means 80 comprises a first leg 81 and a second leg 82 which extend outwardly from the apex of the wedge in a diverging manner. The angle between leg 81 and leg 82 is substantially equal to the angle between wall 43 and wall 53 of exit chamber 40.

A control means 90 is positioned within movable means 80 (having a first and second condition). In the embodiment illustrated in FIGURE 3, control means 90 comprises a first contact means 91 and a second contact means 92. Contact means 92 is attached to movable means 80 and is generally U shaped and is fabricated of a resilient material. A portion of contact means 92 is ferromagnetic which results in a contact means 92 being displaced relative to movable means 80 when subjected to a magnetic flux field of sufficient strength. Contact means 91 is rigidly attached to movable means 80 contiguous contact means 92 and is not affected by a magnetic flux field.

When contact means 91 and contact means 92 are spaced apart as illustrated in FIGURE 3 control means 90 is in a first condition. When contact means 91 and 92 are closed or engaged, control means 90 is in a second condition. Contact means 91 has a terminal means 93 on one end thereof. Contact means 92 has a terminal means 94 on one end thereof. Terminals 93 and 94 are connected by flexible leads 95 and 96 respectively to terminal means 97 and 98 respectively. Terminal means 97 and 98 are adapted to be connected to a suitable external load (not shown).

It should be pointed out that the relative positions of control means 90 and permanent magnet 71 may be interchanged; permanent magnet 71 may be positioned within movable means 80 and control means 90 positioned within chamber 40 and attached to body 12.

In operation, connection means 17 is connected to a fluid source. The fluid flows through connector 17, conduit 14, chamber 15 and orifice 16 into exit chamber 40 and exhausts from chamber 40 through exhaust opening 50. Fluid flowing from orifice 16 into exit chamber 40 forces movable means 80 against wall 43 of exit chamber 40. This is because the orifice 16 is slightly displaced towards wall 53 of exit chamber 40. This results in boundary layer conditions which maintain the flow of fluid along wall 53 of exit chamber 40. Thus, an aerodynamic pressure is exerted upon leg 82 of movable means 80 which is greater than the aerodynamic pressure exerted upon leg 81 of movable means 80. When movable means 80 is contiguous wall 43 contact means 91 and 92 remain spaced apart. Thus control means 90 is in a first condition.

Control ports 20 and 30 are connected to the suitable sensing ports. In this embodiment control passage 20 is utilized as a reference signal passage and control passage 30 is connected to a variable sensing port. When the pressure in fluid control passage 30 exceeds the pressure in fluid control passage 20, fluid flow results in fluid passage 30. The fluid flow in control passage 30 impinges upon the fluid flow from orifice 16 and results in diverting the fluid flow along wall 43 of exit chamber 40. Thus an aerodynamic pressure is exerted upon leg 82 of movable means 80 and displaces movable means 80 so as to engage wall 53 and permanent magnet 71.

When subject to a suitable magnetic field, contact means 92 of control means 90 is displaced relative to movable means 80, toward contact means 91 and engages the same. Thus a circuit is closed between terminal 97, flexible lead 95, terminal 93, contact means 91, contact means 92, terminal 94, flexible lead 96, and terminal means 98 and control means 90 in a second condition. Thus the applicant has provided a unique control means in which a fluid amplifier is combined with movable means and control means to perform a control function.

It should be pointed out that the applicant's invention operates in response to positive pressure and to negative pressure, that is, pressure less than atmospheric.

While I have shown and described a specific embodiment of this invention, further modification and improvement will occur to those skilled in the art. I desire it to be understood, therefore, that this invention is not limited to the particular form shown and I intend in the appended claims to cover all modifications which do not depart from the spirit of the scope of the invention.

What is claimed is:

1. Apparatus of the class described comprising: a housing element; a fluid supply passage within said housing; means for connecting said supply passage to a first fluid source; first and second fluid control passages within said housing; means for connecting said first control passage to a second fluid source; means for connecting said second control passage to a third fluid source; a chamber within said housing; an exhaust opening within said housing, said supply passage, said exhaust opening, and said first and second control passages being in communcation with said chamber; control means including first and second contact means positioned within said chamber and attached to said housing and movable means having contact means thereon positioned within said chamber, said first contact means being spaced apart from said second contact means, said movable means normally engaging said first contact means, said contact means of said movable means engaging said first contact means in response to fluid flow within said first control passage, said contact means of said movable means engaging said second contact means in response to fluid flow within said second control passage.

2. Apparatus of the class described comprising: a housing element; a fluid supply passage within said housing adapted to be connected to a first fluid source; first fluid control passage within said housing adapted to be connected to a second fluid source; second fluid control passage within said housing adapted to be connected to a third fluid source; an exit chamber within said housing, said supply passage and said first and said second control passages being in communication with said exit chamber; control means including a plurality of fixed contact means positioned within said exit chamber and movable means having contact means thereon positioned within said chamber, said plurality of contact means being spaced apart from one another; said contact means of said movable means engaging at least one of said plurality of contact means in response to fluid flow within said first control passage, said contact means of said movable means engaging at least another of said plurality of contact means in response to fluid flow within said second control passage.

3. Apparatus of the class described comprising: a housing element; a fluid supply passage within said housing; means for connecting said supply passage to a first fluid source; first and second fluid control passages within said housing; means for connecting said first control passage to a second fluid source; means for connecting said second control passage to a third fluid source; an exit chamber within said housing, said supply passage and said first and second control passages being in communication with said exit chamber; movable means positioned within said chamber; control means including first and second contact means positioned within said movable member, said first contact means normally being spaced apart from said second contact means; and permanent magnet means within said housing adjacent said chamber, said movable means moving contiguous said magnet means in response to fluid flow within said first control passage thereby causing said first contact means to engage said second contact means.

4. Apparatus of the class described comprising: a housing element; a fluid supply passage within said housing; first and second fluid control passages within said housing; an exit chamber within said housing, said supply passage and said first and second control passages being in communication with said exit chamber; control means including first and second contact means positioned within said chamber and fixed relative to said housing and movable means having contact means thereon positioned within said chamber, said first contact means being spaced apart from said second contact means, said contact means of said movable means engaging said first contact means in response to fluid flow within said first control passage, said contact means of said movable means engaging said second contact means in response to fluid flow within said second control passage.

5. In a fluid amplifier: fluid supply passage; first and second fluid control passages; an exit chamber, said chamber being in communication with said supply passage and said control passages; permanent magnet means located adjacent said exit chamber; movable means within said exit chamber; control means including first and second contact means within said movable means, said movable means being moved contiguous said magnet means in response to fluid flow within said first control passage thereby causing said first contact means to engage said second contact means.

6. In a fluid amplifier including a supply passage and a plurality of control passages: an exit chamber, said chamber being in communication with said supply passage and said plurality of control passages; a source of magnetic flux positioned contiguous said exit chamber; movable means within said exit chamber; control means including first and second contact means within said movable means in spaced relationship; said movable means being moved contiguous said magnetic source in response to fluid flow in one of said control passages thereby causing said first contact means to engage said second contact means.

7. In a fluid amplifier including a supply passage and a plurality of control passages; an exit chamber, said chamber being in communication with said supply passage and said plurality of control passages; movable means within said exit chamber; control means within said movable means having a first and second condition; said movable means being moved in response to fluid flow in one of said control passages thereby causing a change in the condition of said control means.

8. In a fluid amplifier: fluid supply passage; first and second fluid control passages; an exit chamber, said chamber being in communication with said supply passage and said control passages; movable means within said exit chamber; control means within said movable means having a plurality of conditions, said movable means being moved in response to fluid flow within said first control passage thereby changing the condition of said control means.

9. In a fluid amplifier: fluid supply passage; first and second fluid control passages; an exit chamber, said chamber being in comunication with said supply passage and said control passages; movable means within said exit chamber; control means within said chamber having a plurality of conditions, said movable means being moved in response to fluid flow within said first control passage thereby changing the condition of said control means.

10. In a fluid amplifier: a supply passage; first and second control passages; an exit chamber, said chamber being in communication with said supply passage and said control passages; control means within said chamber having a first and second condition; said control means including movable means within said exit chamber, movement of said movable means effective to alter the condition of said control means in response to fluid flow within said first control passage.

11. In a fluid amplifier including a supply passage and a plurality of control passages; an exit chamber, said chamber being in communication with said supply passage and said plurality of control passages; control means having a first and a second condition within said exit chamber, said control means including movable means within said exit chamber; movement of said movable means effective to alter the condition of said control means in response to fluid flow within one of said control passages.

References Cited in the file of this patent

UNITED STATES PATENTS 3,053,276 Woodward ------------ Sept. 11, 1962

OTHER REFERENCES

Bowles, Dr. R. E.: Miniaturized Fluid Control Subsystems Make Moving Mechanical Parts Passé, SAE Journal, October 1961, pp. 91–93.

Popular Science Monthly, July 1960, vol. 177, Liquid Machines, pp. 23–24.